Oct. 25, 1955 C. H. PHELPS 2,721,474
ROTOR BALANCING APPARATUS
Filed May 19, 1952 2 Sheets-Sheet 1
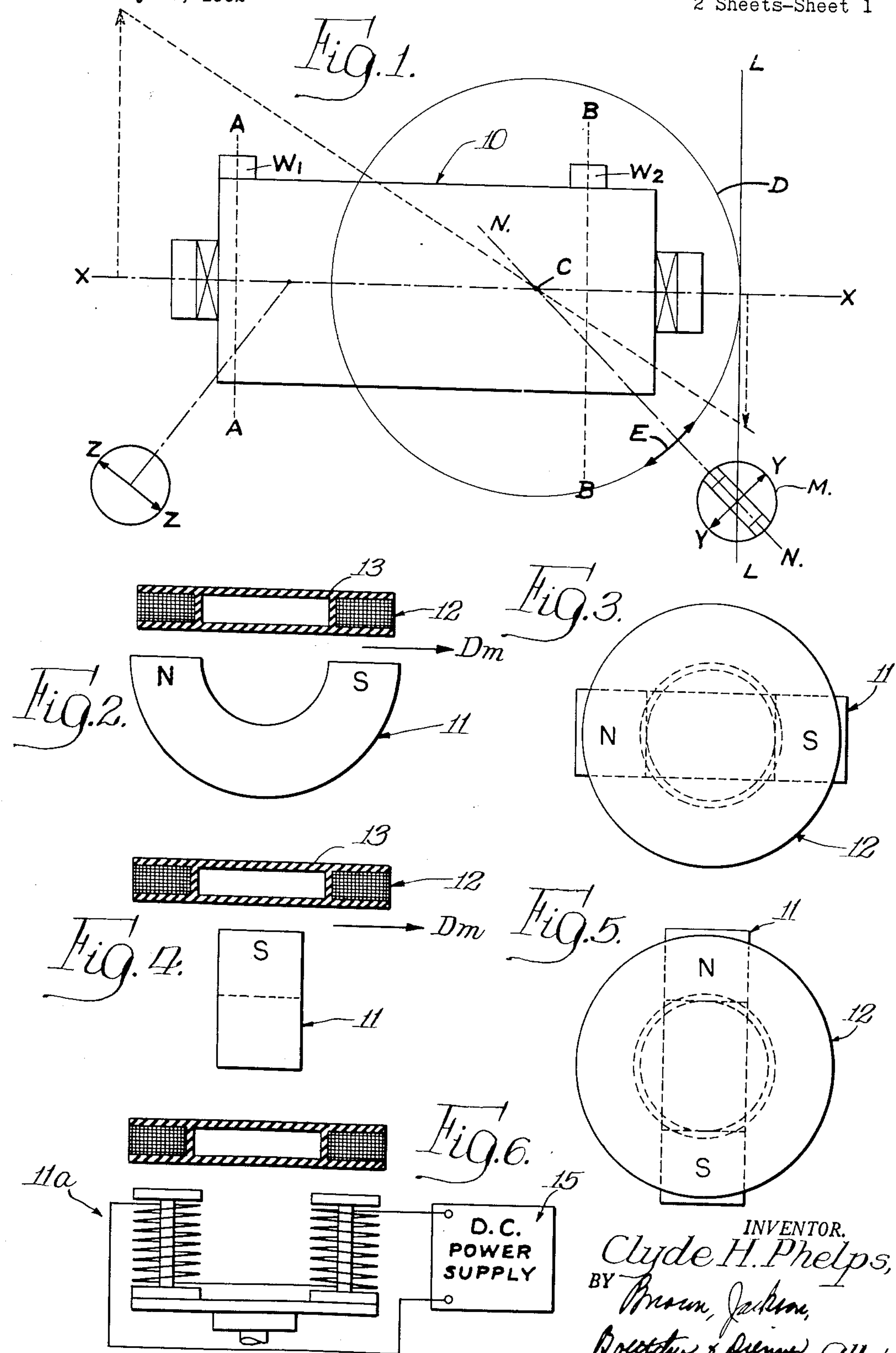
INVENTOR.
Clyde H. Phelps,
BY Brown, Jackson, Boettcher & Dienner Attys.

Oct. 25, 1955 C. H. PHELPS 2,721,474
ROTOR BALANCING APPARATUS
Filed May 19, 1952 2 Sheets-Sheet 2
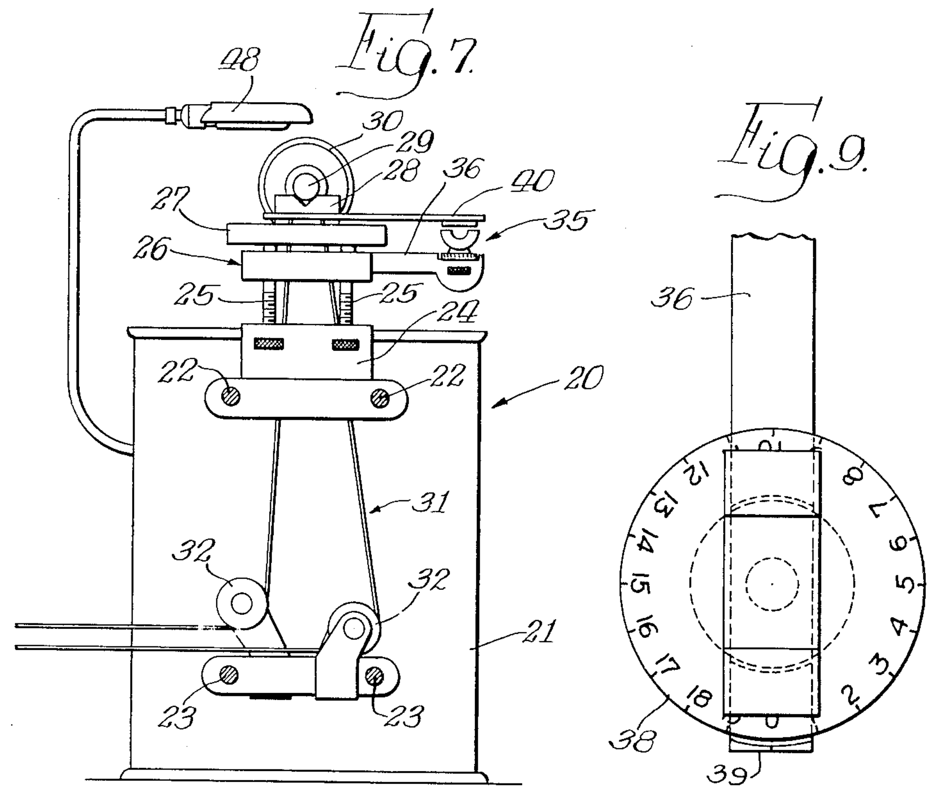
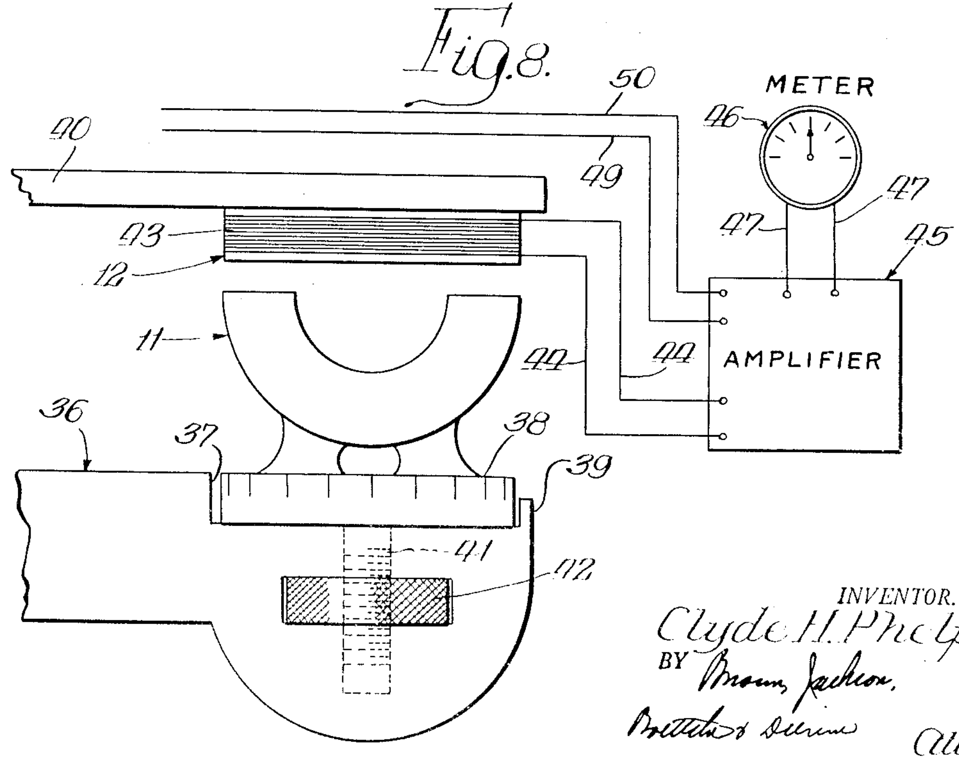
INVENTOR.
Clyde H. Phelps,
BY Brown, Jackson, Boettcher & Dienner
Atty's.

United States Patent Office 2,721,474 Patented Oct. 25, 1955

2,721,474

ROTOR BALANCING APPARATUS

Clyde H. Phelps, Springfield, Ill., assignor to Joseph P. Welch, Lake Springfield, Ill.

Application May 19, 1952, Serial No. 288,730

10 Claims. (Cl. 73—66)

My present invention pertains generally to balancing machines, and in particular to balance indicating apparatus whereby the determination of the weight distribution of a rotating mass about its axis of rotation readily may be determined with a view toward bringing such mass into static and dynamic balance.

An essential concept of the present invention resides in the application of a device responsive to vibrational displacement of a rotating mass, restrictively mounted for movement in a single plane of permissible vibrational movement, with the indicating device having an inherent plane or zone of non-responsiveness to vibrational forces caused by unbalance of the rotating mass so that such a device may be adjusted or selectively positioned to be non-responsive to unbalancing forces acting in one of a pair of selected planes of correction which lie transversely to the axis of rotation of the mass, but which device additionally remains responsive to unbalancing forces present within a second selected plane of reference or correction.

Briefly, it may be stated that the indicator which comprises the nucleus of my present invention is composed generally of a magnetic style of generator capable of producing a voltage, or which, in more elementary illustration, may consist of a coil of wire and a magnet disposed in spaced relation relative thereto whereby movement of the wire and the magnet relative to one another will cause the generation of a current in the wire when the lines of flux of the magnet's field are traversed or cut and will fail to generate a current when the relative movement between the coil and the magnet is such that the direction of motion is parallel to the magnetic lines of flux.

The primary object of my present invention is to provide a simple indicating apparatus capable of operating without the use of springs or spring weight systems and free of any type of mechanical or other type of interconnected system of moving parts.

Another object of my present invention is to provide an indicating apparatus especially adapted for use in balancing machines whereby forced vibrations or oscillations created by the unbalance of a rotating mass causes operation of the indicator in a manner whereby the motion of the indicator is always in-phase with the vibrational motion caused by the unbalance of the mass, and in which such operation is also independent of the speed of rotation of the mass and independent of any resonant period of the mass, with the indicator itself having no period of resonancy.

A further object of my present invention is the provision of a simple means for adjusting my new and improved indicating apparatus to respond to unbalancing forces present in any plane normal to the axis of the rotating mass and whereby the center of oscillation for such plane of unbalance may be determined at any point from positive to negative infinity along a prolonged line coinciding with the geometrical rotational axis of the mass.

Another object of my invention is the provision of means to simultaneously indicate both the value and position of unbalancing forces present in a plane of reference or correction with my new and improved indicator apparatus.

The above and other objects and features of my present invention will be recognized by one familiar with the art from a study of the following specification and description thereof, and with reference to a simplified embodiment thereof exemplified in the accompanying drawings.

In the drawings:

Figure 1 is a diagrammatic representation illustrating the basic concepts and theory of operation embodied in my new and improved indicator which is the subject of my present invention;

Figure 2 is a view in front elevation of a basic magnet and coil generator system as employed in my instant invention, the magnet being shown in cross section;

Figure 3 is a top plan view of the arrangement of the indicator elements demonstrated in Figure 2 showing such elements arranged for maximum response or magnetic generation;

Figure 4 is a front elevational view, similar to Figure 2, illustrating the arrangement of the magnet and coil elements of my new indicator apparatus wherein such elements are positioned for zero response or electromagnetic generation with a given direction of relative movement as indicated.

Figure 5 is a top plan view of the arrangement of elements, illustrated in Figure 4 of the drawings;

Figure 6 is a front elevational view representing schematically the arrangement of an alternate magnet and coil system for use in my indicator wherein the magnetic element thereof is electrically powered;

Figure 7 is a schematic end elevational view of a balancing machine provided with my new and improved indicator;

Figure 8 is an enlarged partial end elevational view of my new indicator mechanism and electrical connections associated therewith as illustrated in Figure 7 of the drawings; and Figure 9 is an enlarged top plan view of the indicator mechanism shown in Figure 8 demonstrating therein the adjusting features associated therewith.

Before entering into the detailed description of the features of my present invention, it is well to consider the theoretical concepts and underlying principles of operation upon which the indicator of my present invention are based. With this in mind, reference is made first to Figure 1 of the drawings wherein a schematic representation of a typical balancing situation is set forth. As shown in that figure, a rotating mass, therein shown as a motor rotor or the like, is indicated generally at 10; the rotor being mounted to permit free oscillatory motion thereof in a single plane of restricted movement, namely, a horizontal plane. The mounting of such a rotor for such restrictive oscillatory or vibrationally induced motion may be accomplished by a number of conventional ways, such as suspending bearing supports for the same on piano wires or supporting such on flexible steel columns or the like. The exact mode of supporting the rotor 10 for vibrationally induced motion in a given restricted plane of movement is immaterial so long as the essential characteristic is maintained whereby the rotor is free to vibrate in substantially a given plane, which in most cases, will be a horizontal plane for convenience sake. In order that connection may be made between the rotor, which is designed to be rotated at high speed or a predetermined R. P. M., and the suspension system, some form of bearing is employed to support the rotor's axis adjacent its opposite ends; these bearings being individually free to move in the plane of permissible movement under the influence of the vibrations of the rotor due to any unbalance of the rotating mass.

With the rotor 10 so arranged for support by any one of a variety of specific forms of known or preferred types of suspension systems conventional in this art, it will be appreciated that a pair of parallel spaced planes of correction, lettered A—A and B—B in the drawing Figure 1, may be selected as convenience dictates; such planes lying substantially transverse to the rotor's axis of rotation. Further, it will be appreciated that theoretically the unbalance of plane A—A may be considered as concentrated in one spot in that plane, such as represented by the unbalancing mass labeled W1. Rotation of the mass on its axis XX at a selected R. P. M. may be assumed to cause the same to oscillate across or in the given horizontal plane of permissible movement about an axis disposed transversely to the plane of permissible movement due to the unbalancing effect of the mass W1 located in plane A—A. This axis of oscillation may be represented by point C located along axis XX of the rotor, substantially as illustrated in Figure 1. For convenience of the present illustration a circle lettered D may be struck about axis C, as its center, and in the horizontal plane of permissible movement. It will be appreciated that the motion of unbalance may be represented by a vector E lying on the circumference of circle D and that all the points on the circumference of circle D enclose a movement plane of rotational oscillation about the vertical axis C in which all points on the circumference of circle D will move the same degree about the center of oscillation C and in the same direction. If now a line L—L be drawn tangentially of the circumference of circle D and transversely of the axis XX of the rotor and a second circle M be drawn, as shown, about a point along line L—L, a line N—N may then be drawn to intersect the center of circle M and axis XX, or axis XX prolonged in either direction, such as represented in Figure 1, intersecting point C. It will be noted, however, that with the location of circle M in the horizontal plane of permissible vibratory motion and having its center lying other than coincident or on line XX, that any straight line drawn through the center of circle M to intersect line XX, or axis XX prolonged in either direction, will intersect such axis only once. Conversely, if circle M were centered or placed on axis XX all points on the axis XX would intersect the center of that circle. With these considerations in mind, it will be understood then that a vibration or oscillation indicator, having a plane of zero response to vibrationally induced forces, may be positioned with its plane of zero response, as represented by line Y—Y, so that the line Y—Y will lie tangent to or parallel to a line of tangency of a circle such as circle D, taken at the point of intersection of said circle with a line, such as line N—N, passing through the centers of circles D and M. The indicator will thus give zero response for any motion along the arc of circle D, such as the motion represented by the arcuate vector E. Stated in other words, so long as the plane of zero response of the vibration indicator is placed other than on the axis XX or XX prolonged of the rotor, the same may be trained to lie in normal relation to a line passing through its center of rotation and the center of oscillation of the rotor in the plane of permissible vibratory motion. Further it will be clear that such an indicator may be located at any point in the horizontal plane of permissible vibratory motion, other than a point lying on the rotor's axis XX or XX prolonged, so that the plane of zero response for such an indicator would lie normal to a line intersecting only one point on axis XX or XX prolonged in either direction. Accordingly, with its plane of zero response so placed, the indicator would then respond to motion of the axis XX in the plane of permissible vibratory motion about any point along axis XX other than the point of intersection with that axis of a plane or line lying normal to the indicator's plane of zero response and passing through the rotor's center of oscillation, such as point C.

The above relation may be more clearly understood by specific example, as for instance, the presence of the unbalance mass W1 in plane A—A of the rotor 10 in Figure 1, may be assumed to give oscillation of the rotor about the axis of oscillation represented by point C lying on axis XX. If the plane YY of zero response for the indicator be placed in normal or transverse relation to a plane passing through such center of oscillation, such as is represented by line NN of Figure 1 (such plane lying other than coincident with the axis XX of the rotor) oscillatory motion of the rotor due to the unbalancing mass W1, as represented by the arcuate vector E, will not cause vibrational response of the indicator. This relation will hold true since the plane of zero response YY of the indicator lies tangent to or parallel to a line of tangency of the circle D representing the circle of vibratory motion of the rotator created by the unbalancing mass W1, as explained above. However, the presence of a second unbalancing mass, such as mass W2 in plane BB, will cause oscillatory motion of the rotor about a secondary axis of oscillation, other than as represented by point C, so that the plane YY of zero response for the indicator will not then lie normal to a plane passing through the center of circle M and such a secondary axis of oscillation. Therefore, the vibration indicator will respond to motion induced by the presence of the unbalancing force W2, as the rotor moves in the plane of permissible vibratory motion.

With the above concepts in mind, it will be appreciated that a vibration responsive indicator having a plane of zero response may be positioned as illustrated in the diagrammatic representation in Figure 1 of the instant drawings, so as to be immune to vibrational motions induced by the presence of unbalancing mass in only one given selected plane of correction such, as for instance, mass W1 in plane A—A of Figure 1 as explained hereabove. Likewise a secondary similar vibrational indicator, having a plane of zero response, such as Z—Z seen in Figure 1, may be placed with its plane of zero response such that it will not respond to motion induced by the presence of an unbalancing mass present in a second selected plane of correction such, as for example, mass W2 in plane B—B as seen in Figure 1 of the drawings. However, it will be understood that with each of the two indicators so positioned to discriminate against motion produced by unbalancing mass present in only one plane of correction, such indicators will nevertheless respond to the presence of unbalancing mass in any other selected parallel plane of correction taken through the rotor. In other words, the indicator set to discriminate against the motions induced by the mass W1 in plane A—A will nevertheless respond to the presence of unbalancing mass in the plane of reference B—B as shown in Figure 1. Likewise, the indicator set for zero response as related to the presence of unbalancing mass W2 in B—B will nevertheless respond to vibrations induced by the presence of mass W1 in plane A—A as illustrated in Figure 1.

In a copending application, Serial No. 250,863, filed October 11, 1951, I have disclosed and described a vibrational responsive indicator having an inherent plane of zero response, such constituting in essence a resilient reed or leaf spring wherein the plane of formation of the reed or spring itself constituted the plane of immunity to vibration. It will be understood, however, that such an indicator inherently carries with it, due to its physical makeup, a period of self resonance as have all the previous known devices of this nature of which I am presently aware. When using an indicator having its own period of resonance in a balancing system such as that to which my present invention is adapted, it will be recognized that such period of resonance for the indicator must be taken into account in evaluating and determining the information taught by the indicator. Therefore, it will be recognized immediately, as is well known in the art, that with an indicator having its own period of resonance, operation of the balancing machine and rotation of the mass to be correctively balanced may taken place either above, below or at the natural resonant period of the indicator. Therefore, to properly evaluate and determine the results given by the indicator one must first known at what point in the vibrational scale of the indicator the operation of the balancing mechanism is being conducted since the results above, below and at the resonance period of the vibration indicator itself have different meaning to the evaluator of the information and must be truly determined before a proper balancing of the mass may occur.

Recognizing the inherent difficulties of a vibration responsive indicator having its own vibrational period, I have devised a new and improved indicator having an inherent plane or zone of zero response to vibrational motion which constitutes the heart of my present invention as will now be described. A marked feature of distinction between the indicator of my present invention and those heretofore known is inherent in its construction which, along with its simplicity of operation, marks the same as an improved advancement over the teachings of the prior art in this field. This outstanding feature of which I refer is in essence found in the fact that the indicator of my present invention contains no natural period of resonance or vibration so that this factor may be entirely disregarded in accomplishing the balancing of a rotating mass therewith.

Turning now to the drawing Figures 2 through 5 in particular, it will be seen that I have therein set forth, in a simplified manner, the basic features of an indicator system adapted for the purposes and objects as set forth above which embodies the advantages of a vibration responsive indicator system having an inherent plane of zero response to vibratory motion and which is, nevertheless, free of any natural period of vibration or resonance and therefore is extremely valuable in its application to the art of balancing a rotating mass. In Figure 2 of the drawings it will be seen that a simple horseshoe magnet 11 is represented therein having north and south polar ends disposed in spaced relation to a coil of wire 12 supported on an insulating core or spool 13. When the magnet and coil are arranged as illustrated in Figure 2 of the drawings, it will be recognized that if the coil 12 be moved in the direction of the arrow D*m* or conversely if the magnet is moved in the direction of the arrow D*m*, a voltage will be induced in the coil due to the cutting of magnetic lines of flux, according to recognized principles of physics. However, if the magnet 11 is rotated to the position shown in Figures 4 and 5 of the drawings and either the magnet or the coil moved in the direction indicated by arrow D*m*, substantially no voltage will be induced in the coil as the relative motion between the coil and magnet is such that the conductor moves in the magnetic field.

It further will be appreciated that with the relation of the north and south polar ends of the magnet, as illustrated in Figure 2, and the relative movement between coil and magnet according to arrow D*m*, such may be said to induce a positive voltage. Therefore, if the polarity of the magnet 11 is maintained as illustrated and the relative motion between magnet and coil is reversed, a voltage of correspondingly related negative value will be induced. It thus will be understood that with reciprocal motion of the coil relative to the magnet or the magnet relative to the coil, resulting in a transverse or substantially transverse cutting of the lines of magnetic flux, the generation of a voltage of positive and negative quality will take place so that in effect the magnet and coil system represented comprises a small magnetic alternating current generator. Reversal of the magnet's poles to a position opposite that of Figure 2 will likewise cause generation of an alternating current upon reciprocation of coil 11 but 180° out of phase with that obtained from the illustrated setup.

Therefore, it will be noted that there are two positions of the magnet relative to the coil wherein zero response or substantially no induction of voltage, for relative motion between the magnet and coil in a given direction, will occur and conversely there are two positions giving maximum indicated response or induced voltage upon relative motion between the coil and magnet in the selected given direction. Accordingly, a voltage will be induced in the coil by the movement thereof relative to the magnet whenever the magnet as shown, or a magnet of reverse polarity, is positioned anywhere between the position shown in Figures 2 and 3 and that of Figures 4 and 5 for selected direction of motion, as example, according to the arrow D*m* of these figures.

As illustrated in Figure 6 of the drawings, the permanent magnet 11 of Figures 2 through 5 may be replaced with an electromagnet 11*a* powered from a D. C. supply source 15, as diagrammatically indicated in this figure. When such a modified magnet is used, it possesses an advantage over the permanent magnet in that a constant regulated voltage may be applied thereto to maintain a constant magnetic field which will advance the accuracy of operation of my new and improved indicator.

Utilizing the principles, as outlined above, and a device comprising basically a magnet and a coil mounted on an insulated core as illustrated in Figures 1 through 6 of the drawings, I propose to embody such in a suitable indicator mechanism adaptable for use with any of a known specific or preferred style of balancing mechanism, such as that illustrated in Figure 7 of the drawings.

With reference to this latter figure, it will be understood that the balancing mechanism 20 therein illustrated, comprises a pair of ground engaging pedestal portions 21 between which extend upper and lower pairs of horizontally disposed and vertically spaced cross bar members 22, 22 and 23, 23 respectively. The uppermost pair of bars 22, 22 mount a pair of work supporting carriage structures 24, one adjacent each pedestal 21. Each work supporting carriage 24 is provided with pairs of vertical aligning studs 25, 25 which threadingly support a mounting plate 26 at their upper ends. A work supporting plate 27 is preferably mounted for rolling movement over and relative to plate 26. Such a mounting may be accomplished, for example, by providing a groove (not shown) in the face of plate 27 opposite a similar groove in plate 26 to form a ball bearing race which holds ball bearings. A construction suitable for this purpose is to be found in United States patent to Penney No. 2,343,575, dated March 7, 1944. The work supporting plate 27 in turn mounts one of a pair of spaced, axially aligned bearing block members 28 which support end portions 29 of an armature shaft associated with a rotor such as 30, illustrated. A belt drive means 31 is trained over a pair of guide sheaves 32, 32 located between the ground engaging pedestals 21 and supported by the lower bar members 23, 23. The drive belt means is powered by a suitable electric motor (not illustrated) to frictionally drive the rotor 30 to be balanced. With this arrangement, rotational movement of rotor 30 is readily gained in an easy and convenient manner and the mounting of the supporting plate over the ball bearings and mounting plate 26 permits free movement of the rotor in a restricted horizontal plane whereby unbalanced masses in the rotor will cause oscillatory motion of the rotor in a single plane of permissible motion as desired.

My new indicator mechanism, designated generally by numeral 35, is to be mounted on the apparatus as illustrated in Figure 7, it being understood that various other means for supporting the rotor for movement in a single plane of permissible oscillatory motion may be used.

With particular regard to the indicating apparatus 35 of my instant invention, it will be appreciated from Figures 8 and 9, that such comprises a magnet mounting arm 36 attached rigidly to the stationary mounting plate member 26 so as to extend outwardly of one side thereof a distance convenient to accommodate the magnet's ready observation and availabiliy to the operator. Mounted near the outer end of arm 36, in an indented recess 37 thereof, is the magnet 11 of a horseshoe variety, as illustrated in Figures 2 through 5 of the drawings, which is provided with a rigidly connected indicator dial 38. The dial 38 has inscribed thereon suitable markings and numerals, such as are illustrated in particular in Figure 9 of the drawings, for indexing and determining the rotated position of the magnet relative to the non-rotatable mounting of the coil portion of the indicator system. An index pointer 39 is also provided against which the index markings on the dial 38 are read. It will be seen also that the magnet member 11 is mounted with the tines of the horseshoe pointing upwardly so as to be spaced immediately adjacent and beneath the overlying coil 12 which is fixed by arm 40 to the movable support plate 27, on which the rotating mass is supported. The magnet 11 is further provided with an adjusting stud 41 located centrally therebeneath which extends into a suitable opening therefor formed in the mounting arm 36. The stud 41 threadingly receives a knurled adjusting nut 42, as represented in Figure 8 in particular. It will be appreciated that threading adjustment of the nut 42 on the threaded adjusting stud 41 serves to move the magnet vertically to cause variation in the air gap between the upper faces or polar ends of the magnet 11 and the adjacent face of coil member 12.

As seen in Figure 8 of the drawings, a winding 43 of the coil 12 is connected electrically by leads 44, 44 to an amplifier, indicated generally by numeral 45, which may include any one of a number of known styles of electronic or other type of amplifying circuits whereby the voltage generated by the cutting of the magnetic lines of flux in response to movement of the coil relative to the magnet's poles is amplified to a stage suitable for driving a volt meter 46 associated in circuit with the amplifier by conductors 47, 47. The preferred requisite for the amplifier stage is that such should be a high resistant load type having a fixed phase angle relation with respect to the motion produced by the unbalance of the rotor and which may in turn be electrically connected to a stroboscopic lamp 48 for driving the same by means of circuit connecting leads 49 and 50. With the amplifier arranged for the desired phase angle relationship with the motion of the unbalanced rotor, the stroboscopic lamp may be driven or lighted up to indicate the angular disposition of the unbalancing force effect on the rotating mass according to conventional and well recognized principles. Greater amplification as to the exact mode of operating a stroboscope for indicating the angular displacement of the unbalancing effect may be had by reference to U. S. patent to Swedlund, No. 2,092,096, dated September 7, 1937; Puckle, "Time Basis," pages 57–58, John Wiley & Sons, New York, N. Y., publishers, or O. H. Schmidt, "A thermionic trigger," Journal Scientific Instruments, 1938, vol. XV, page 24.

With the indicator system organized as described hereabove, the voltage generated by the cutting of the magnetic lines of flux will be proportional to the amplitude of the motion produced by the unbalancing forces present in the rotating mass. Therefore, the meter driven by the amplifier will give an accurate indication of the amplitude of unbalance and the lighting off of the stroboscopic lamp at designated periods will give an accurate indication of the angular disposition of the unbalancing forces sought to be combatted in the rotating mass, according to conventional and known practice.

It also will be understood that the mounted positions of the coil and magnet, as described hereabove, may be interchanged or reversed without impairment of the operating results obtained from the indicator system, it being essential only that relative motion between these two elements be maintained and that one of them be rotatable or adjustable to effect the cutting or non-cutting of magnetic lines of flux as desired. Substitution of the electromagnet **11*a*** of Figure 6 for the permanent magnetic element of the indicator system gives rise to the added advantage of a constant magnetic field with the additional advantage of permitting the varying or adjustment of the magnetic flux strength to a desired value by regulation of the voltage driving the same.

*Use and operation*

In performing a balancing operation of a rotor with an indicator as I have described hereabove, and especially as related to a number of items of similar nature which are to be balanced on a production basis, it is preferable that the initial test piece be balanced to a desired true state by any one of a number of recognized methods or by trial and error whereby the balanced test piece may be applied to the machine as illustrated in Figure 7 of the drawings herein so that such may be set up for balancing on a production run basis. Be that as it may, having once acquired the initial test piece in a perfectly balanced state, such is then placed between the bearings 28 of the balancing mechanism and the desired position of the reference planes or planes of correction AA and BB, in which the corrective weight changes are to take place, selected as desired. Having located the planes of balancing correction, each of the indicators of my present invention, disposed adjacent the ends of the rotor may be adjusted for discriminating or being non-responsive to unbalanced vibratory motion caused by unbalance in one of the two selected planes of unbalance. That is, having a perfectly balanced rotor in the machine the right hand indicator, for example, may be set such that its plane Y—Y of non-response lies normal to a line passing through the center of oscillation caused by placing an unbalanced mass W1 of known quantity in the left hand correction plane, or that plane corresponding to plane A—A in Figure 1 of the drawings. With the right hand indicator thus set, it will be appreciated, as described hereabove, that it will effectively discriminate or be non-responsive to any unbalancing force present in the left hand plane of correction, but will produce or generate voltage due to unbalance in any other parallel plane of the rotor. The left hand indicator is then likewise set so that its plane Z—Z is non-responsive to the addition of a known unbalancing weight W2 placed in the second plane of correction, or that plane corresponding to plane B—B as illustrated in Figure 1 of the drawings, whereby such indicator will be responsive to unbalancing forces present in any other parallel plane taken transversely of the axis of the rotor other than the reference plane B—B. When setting up the second indicator the initially included unbalancing weight W1 in plane A—A is of course removed prior to the addition of unbalancing weight W2. With the two indicators each thus set for zero response, to unbalance in one of the two selected planes of correction, the initial test piece may be removed from the balancing machine and a rotor or mass of unknown weight distribution characteristics placed thereon and rotated at the desired R. P. M. With the machine thus operating, the right hand indicator, being discriminatory or non-responsive to unbalance in the left hand correction plane, will nevertheless generate a voltage for any unbalance dynamic, static or a combination of the two, present in the right hand correction plane. Energization or lighting up of the stroboscopic lamp as described heretofore, of course, will indicate the angular disposition of the unbalancing effect in the right hand correction plane. Correction for the unbalancing effect in the right hand correction plane may then be made by the addition or subtraction of weights from that plane according to known practice with the diminution of the unbalancing effect in the right hand plane being indicated by a proportional and corresponding reduction in the voltage generated by the right hand indicator because of its reduction of amplitude of oscillation leading to the diminution of the voltage generated by the right hand indicator. Likewise, the left hand indicator will generate a voltage proportional to the unbalancing effects present in the left hand correction plane while the same ignores any unbalance present in the right hand correction plane. However, it will be appreciated that having once counteracted the unbalancing effects in the right hand correction plane by the outlined initial steps employing the right hand indicator, the left hand indicator will then indicate only the remaining unbalance effects in the rotor which will then be present or correctable in the left hand correction plane.

Therefore, it will be appreciated that a ready and convenient means for effecting a rapid and efficient correction, especially in production line work, for rotors or masses of like or similar design, is readily available through the utilization of my new and improved indicator mechanism herein of subject. Further, it will be appreciated that while I have herein described the association of my new and improved indicator with one form or schematic style of balancing machine, numerous other known or preferred styles of balancing machines may be used therewith with like facility. The simplicity of operation of my new and improved indicator device and its lack of a self produced amplitude or period of natural resonance, which heretofore affected the relationship of the indicator with the supporting means and oscillations of the rotor or mass to be balanced, marks my present device as a great improvement and advancement over devices of this nature presently utilized in the industry and known in the art. Also, due to the fact that there are no interconnected moving parts embodied in the simplified generator principles of my present invention and no interconnection between the coil portion and the magnet thereof other than magnetic, it will be recognized that its very structure marks the indicator as a great improvement over present known devices and provides a means for effectively arriving at a quick and ready determination of the forces causing the unbalance of the rotating means. Therefore, my indicator readily lends itself to efficient mass production balancing in particular. Although there may be other advantages and improvements embodied with the basic principles of my indicator, as heretofore set forth, as well as various changes, modifications and substitutions of equivalents made in its specific features as herein described, nevertheless, such would no depart from the basic spirit and scope of my instant invention. Therefore, I do not wish to be limited to the specific embodiment herein illustrated and described except as may appear in the following appended claims.

I claim:

1. In an indicator apparatus of the class described, means for mounting a mass for rotational movement and in a manner such that the same is also free to oscillate in a single plane in response to vibrational forces produced by unbalanced mass therein, a substantially planar electrical coil member disposed parallel to said plane, a magnet member disposed adjacent said coil and having polar faces in spaced parallelism with said coil's plane, means for producing relative translatory motion between said magnet and coil members in response to vibrational oscillation of said mass in the said single plane; said relative motion being parallel to the plane of said coil and the magnetic pole faces, adjustor means for effecting relative rotation between said coil and said magnet members by rotating the latter member about an axis normal of the coil's plane thereby to selectively effect a maximum cutting of magnetic flux by the said relative motion to induce voltage in the said coil, and means electrically connected to said coil for indicating said voltage.

2. A vibration responsive indicator for use in determining weight distribution of an unbalanced rotating mass restrictively mounted for free vibratory oscillation in a single plane, comprising, an electrically conductive coil having a plurality of turns defining substantially a plane, said coil being moveable with said mass in said single plane of oscillation and at a position displaced from the rotational axis of such mass, magnetic means mounted adjacent said coil and having polar end faces in spaced parallelism to the plane of said coil, means for adjustably moving said magnetic means and about an axis normal to the plane of said coil selectively to position the polar ends thereof to cut maximum or minimum magnetic flux lines during movement of said coil with said mass; movement of said coil being in its own plane parallel to the plane of the magnetic pole faces to cause voltage induction in said coil when magnetic flux is cut, and means electrically connected to said coil for indicating the voltage induced in said coil.

3. An indicator apparatus for use with a balancing mechanism of the class described whereby the weight distribution characteristics of an unbalanced rotating mass which is restrictively mounted for free vibratory movement in a single plane may be determined, comprising, a wire coil member of electrical conductive material having its turns composed to define substantially a single plane, a magnet member mounted with its polar end faces parallel spaced relation to the plane of said coil and presenting a magnetic field thereto, means for reciprocating one of said members relative to the other and with said rotating mass in the said single plane of free vibratory movement, the plane of said coil and the polar end faces of said magnet remaining uniformly parallel throughout such reciprocating movement; and means for adjusting said magnet member's polar ends about an axis normal to the plane of said coil member to cut a maximum or a minimum number of flux lines during the relative reciprocation of said two members in response to the oscillations of said mass.

4. An indicator for use in determining the weight distribution of an unbalanced rotating mass mounted restrictively for free movement in a single plane, comprising, a relatively thin electrical conductor coil having its turns arranged to define substantially a plane, a magnet member having polar end faces in spaced parallelism with the plane of said conductor and presenting a magnetic field thereto, means for reciprocating one of said members relative to the other in and along said mass's single plane of free movement and with said mass about the latter's axis of oscillation as defined by the distribution of unbalanced weight therein, the plane of said coil and the polar end faces of said magnet remaining uniformly parallel throughout said reciprocation, means for adjustably rotating said magnet member relative to said coil and about an axis normal to the latter's plane of formation, such rotational adjustment of said magnet member serving to selectively condition said two members to relate the direction of relative reciprocation therebetween according to and transversely of the direction of said magnetic field thus to selectively induce maximum or minimum voltages in said conductor coil, and meter means electrically connected to said conductor coil for indicating such maximum and minimum voltages.

5. An indicator for use in determining the weight distribution of an unbalanced rotating mass mounted respectively for free oscillation in a single plane, comprising, an electrical conductor coil member having its turns defining substantially a plane, a magnet member arranged with its pole faces in adjacent parallelism with the plane of said conductor coil member and presenting a magnetic field thereto, means for reciprocating one of said members relative to the other along said single plane and with said mass about the latter's axis of oscillation as defined by the distribution of unbalanced weight therein, the plane of said coil and the pole faces of said magnet remaining uniformly parallel throughout said reciprocation; means for adjustably rotating said magnet member relative to said coil member and about an axis normal to the latter's plane of formation, such rotary adjustment of said magnet member serving to selectively condition the direction of relative reciprocation between said two members and the direction of said magnetic field for inducing maximum or minimum voltages in said conductor coil, means for amplifying the voltages induced in said conductor coil, and meter means electrically connected to the said amplifying means for indicating such voltage.

6. A vibration responsive indicator for use in determining weight distribution of a rotating mass restrictively mounted for free vibratory movement in a single plane, comprising in combination, a wire coil member movable with the rotating mass in the said single plane of free vibratory movement thereof and located at a point in said plane remote from the axis of rotation for said mass, such coil having its turns substantially in or close to a single plane; a magnet adjustably mounted with its pole faces in parallel adjacency to the plane of said coil, said coil being reciprocally movable in its plane with said mass parallel to the plane of the magnet's pole faces, means for rotatably adjusting the said magnet relative to said coil and about an axis normal to the plane of said coil thereby to cut and avoid cutting magnetic lines of flux during the reciprocal movement of said coil, the cutting of said magnet's lines of flux inducing a voltage in said coil, and means electrically connected to said coil for indicating the presence, absence and value of voltages induced in said coil.

7. In combination, a pair of spaced mounting means for rotatably supporting a rotor whose weight distribution characteristics are to be analyzed, supporting means for holding said mounting means and restricting their free movement to a single plane, a substantially planar wire coil connected to said mounting means for movement in said plane therewith, said coil being related in parallelism with the said single plane of movement of said mass, electrical meter means connected in circuit with said coil, and a magnet mounted on said support means with its polar end faces in adjacent parallelism with the plane of said coil, said magnet being rotatably adjustable about an axis normal to the coil's plane whereby the polar end faces thereof may be positioned to selectively cause movement of said coil to cut a minimum or a maximum number of magnetic flux lines; said coil being moved in its plane with translatory motion parallel to the plane of said polar end faces.

8. In combination, journal means for rotatably supporting a rotor to be analyzed, support means for the journal means permitting substantially free oscillatory motion thereof in a single plane, a substantially planar coil of wire mounted to move said journal means in said single plane of movement, a horseshoe magnet mounted with both its polar end faces in parallel spaced adjacency to the plane of said coil, and means supporting said magnet and restricting its movement to rotation about an axis lying normal to said single plane of movement and the plane of said coil whereby the poles of said magnet may be adjustably positioned relative to said coil so that movement of the latter relative to the former selectively cuts maximum or minimum magnetic lines of flux thereby to selectively induce a voltage in said coil; the said coil having translatory movement in its plane parallel to the plane of the magnet pole faces.

9. An indicator apparatus of the class described for use in determining weight distribution of an unbalanced rotating mass mounted for free vibratory movement in a single plane, comprising in combination, a coil of wire disposed in the plane of free movement of said rotor and at a point removed from said rotor's rotational axis, said coil being substantially planar and movable with said rotor in said single plane about an axis of oscillation for said mass determined by the unbalance thereof, a magnet having a pair of magnetic pole faces spaced adjacently parallel to the plane of said coil, means for holding said magnet stationary except for rotational adjustment about an axis normal to the said plane of movement whereby the magnetic pole faces thereon may be adjustably positioned relative to said coil to result in the cutting of a maximum number of magnetic lines of flux; said coil reciprocating in its plane parallel to the plane of the magnetic pole faces, the cutting of said lines of flux by the movement of said coil inducing a voltage therein; and meter means connected in circuit with said coil for indicating the said voltage.

10. An indicator for use in determining the weight distribution of an unbalanced rotating mass mounted restrictively for free movement in a single plane, comprising, a conductor coil member defining substantially a plane and disposed generally parallel to the said single plane of movement for said mass, a magnet member having polar ends defining a plane lying substantially parallel to the plane of said coil member and presenting a magnetic field to said coil; means for reciprocating one of said members relative to the other, in and along said single plane with said mass and about the latter's axis of oscillation, means for adjustably rotating the magnet member relative to said coil member and about an axis normal to the latter's plane of formation, such rotational adjustment of said magnet member serving to selectively relate the direction of relative reciprocation of said two members according to and transversely of the direction of said magnet's field thereby to generate maximum or minimum voltages, respectively, in said conductor coil, and means electrically connected to said coil for indicating such voltages.

References Cited in the file of this patent

UNITED STATES PATENTS

| | | |
|---|---|---|
| 982,343 | Aylward | Jan. 24, 1911 |
| 2,050,073 | Thearle | Aug. 4, 1936 |
| 2,451,863 | Oakley | Oct. 19, 1948 |